March 16, 1926. 1,577,097
H. BARTHEL
MACHINE FOR GRINDING ROLLERS
Filed July 16, 1925
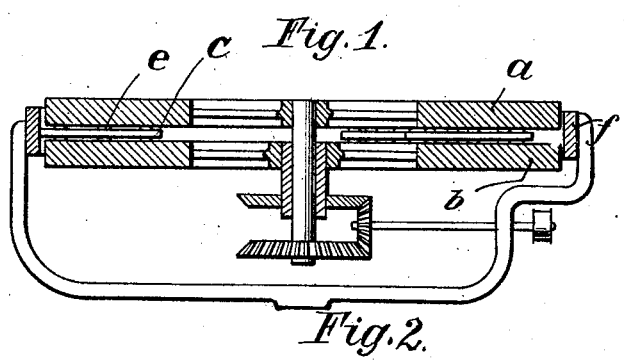
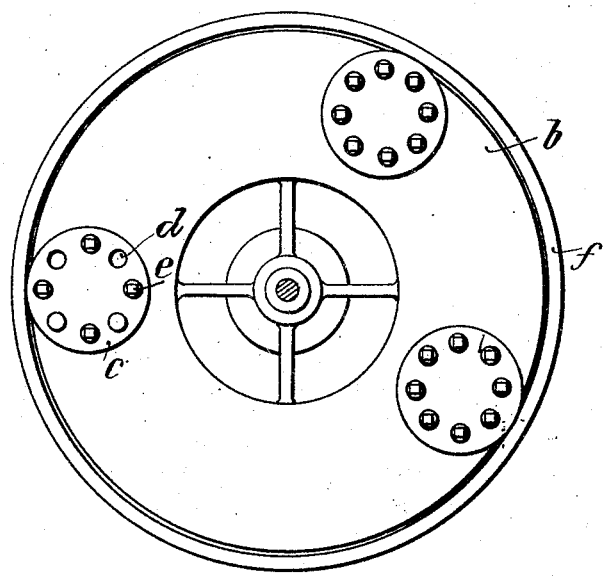

Patented Mar. 16, 1926.

1,577,097

UNITED STATES PATENT OFFICE.

HERMANN BARTHEL, OF SCHWEINFURT, GERMANY.

MACHINE FOR GRINDING ROLLERS.

Application filed July 16, 1925. Serial No. 44,077.

*To all whom it may concern:*

Be it known that I, HERMANN BARTHEL, a subject of the Republic of Germany, residing at Hauptbahnhof 10, Schweinfurt, Germany, have invented a certain new and useful Improved Machine for Grinding Rollers (for which I have filed an application for patent in the German Patent Office on July 10, 1924), of which the following is a specification.

This invention relates to machines for grinding rollers, in which the rollers are ground between two revolving flat grinding discs. Such machines have heretofore been so arranged that the rollers are held in a cage capable of rotation about the axis of the discs, where they are forced to rotate at a different peripheral speed than corresponds to the relative speed of the parts of the grinding discs contacting with them, or the work pieces driven outwards by centrifugal force were caused to roll on a guiding ring bounding the gap between the grinding discs and fixed to the lower disc.

The present invention is based on the latter type of machine and is characterized in the first place in this, that the rolling surface between the discs for grinding the work pieces is provided by a rim which is not connected to one of the discs. By this means a favorable relative motion between the work pieces and the grinding discs is obtained. Preferably the grinding discs are rotated in opposite directions and the guiding ring is stationary. The work pieces, for instance the races for ball bearings, may themselves roll directly along the guiding ring or be guided in cage-like holders which latter are annular and roll along the rim.

In the accompanying drawing a constructional example of a machine according to the present invention is shown diagrammatically, Fig. 1 being a cross-section and Fig. 2 a view from above with the upper disc removed.

Between the grinding discs $a$, $b$ are the cages $c$ which in holes $d$ guide the work pieces, in this case the rollers $e$. When the machine is in operation, the cages $c$ roll along the guiding ring $f$ which is separate from the grinding discs, but may be fixed to one of the discs. The discs $a$, $b$ preferably rotate in opposite directions.

The rollers to be ground are ground according to their position in the holes $d$ on their cylindrical surface or on their end surfaces. By giving the holes a suitable shape the peripheral surface of the rollers may be made slightly barrel-shaped. The cages $c$ need not be circular, but may have an elongated form and roll along a guiding ring with recesses.

What I claim is:—

1. A grinding machine including superposed grinding disks spaced apart, an endless band surrounding the space between the disks, one of the disks being rotatable relatively to the other disk and one of the disks being rotatable relatively to said band, and a cage arranged between the disks and having apertures to receive the articles to be ground, said cage engaging the band and being caused to rotate in a plane due to the centrifugal force exerted by said rotatable disk.

2. A grinding machine including superposed grinding disks, means for rotating the disks in opposite directions, said disks being spaced apart, an endless band surrounding the space between the disks, one of the disks being rotatable relatively to said band, and a cage arranged between the disks and having apertures to receive the articles to be ground, said cage being adapted due to the centrifugal force set up by the rotatable disks to engage the band and to roll thereon.

3. A grinding machine including superposed grinding disks spaced apart and rotatable in opposite directions, an endless stationary band surrounding the space between the disks, and a cage arranged between the disks and having apertures to receive the articles to be ground, said cage, due to the centrifugal force set up by the disks, being adapted to roll on said band.

In testimony whereof I have signed my name to this specification.

HERMANN BARTHEL.